(12) United States Patent
Sircar et al.

(10) Patent No.: US 8,095,900 B2
(45) Date of Patent: Jan. 10, 2012

(54) ACHIEVING CLOCK TIMING CLOSURE IN DESIGNING AN INTEGRATED CIRCUIT

(75) Inventors: Sourav Kumar Sircar, Kolkata (IN); Manish Baronia, Gargaon (IN)

(73) Assignee: Cadence Design Systems, Inc., San Jose, CA (US)

( * ) Notice: Subject to any disclaimer, the term of this patent is extended or adjusted under 35 U.S.C. 154(b) by 624 days.

(21) Appl. No.: 12/211,778

(22) Filed: Sep. 16, 2008

(65) Prior Publication Data

US 2010/0070941 A1 Mar. 18, 2010

(51) Int. Cl.
*G06F 17/50* (2006.01)
*G06F 9/455* (2006.01)

(52) U.S. Cl. ........ 716/104; 716/108; 716/113; 716/114

(58) Field of Classification Search .............. 716/104, 716/108, 113, 114
See application file for complete search history.

(56) References Cited

U.S. PATENT DOCUMENTS

| | | | | |
|---|---|---|---|---|
| 6,658,628 | B1 * | 12/2003 | Landy et al. | 716/103 |
| 7,331,024 | B2 * | 2/2008 | Sato et al. | 716/104 |
| 7,467,367 | B1 * | 12/2008 | Li et al. | 716/103 |
| 2002/0162086 | A1 * | 10/2002 | Morgan | 716/18 |
| 2004/0168140 | A1 * | 8/2004 | Chang | 716/6 |
| 2004/0225984 | A1 * | 11/2004 | Tsao et al. | 716/10 |
| 2005/0223344 | A1 * | 10/2005 | Sato et al. | 716/1 |
| 2006/0064658 | A1 * | 3/2006 | Minonne et al. | 716/6 |
| 2006/0090153 | A1 * | 4/2006 | Ho et al. | 716/11 |
| 2007/0006105 | A1 * | 1/2007 | Bartling et al. | 716/6 |
| 2007/0033560 | A1 * | 2/2007 | Johnston | 716/6 |
| 2007/0220465 | A1 * | 9/2007 | Tsuchiya | 716/5 |
| 2008/0129362 | A1 * | 6/2008 | Kawai | 327/292 |
| 2008/0301594 | A1 * | 12/2008 | Jiang et al. | 716/2 |
| 2009/0199143 | A1 * | 8/2009 | Schlotman et al. | 716/6 |
| 2009/0217225 | A1 * | 8/2009 | Sunder et al. | 716/6 |
| 2009/0254874 | A1 * | 10/2009 | Bose | 716/6 |

* cited by examiner

*Primary Examiner* — Stacy Whitmore
(74) *Attorney, Agent, or Firm* — Alford Law Group, Inc.; William E. Alford

(57) ABSTRACT

Achieving clock timing closure in designing an integrated circuit involves virtually synthesizing a clock network for the integrated circuit design to generate virtual clock buffering in the clock network before a point in the design flow at which the clock network is actually synthesized and committed to a netlist. Timing violations are determined for clock gates generated by the virtual clock buffering. Clock gating transforms are evaluated for the clock gates having the timing violations, based on recalculated clock and data path delays, to incrementally virtually synthesize the clock network. The clock gating transforms that result in the best timing gains are committed to the netlist. The clock network is then actually synthesized for the integrated circuit design, and design changes, due to the actual clock network synthesis, are committed to the netlist.

23 Claims, 4 Drawing Sheets

ACHIEVING CLOCK TIMING CLOSURE IN DESIGNING AN INTEGRATED CIRCUIT

BACKGROUND OF THE INVENTION

In the design process for an integrated circuit, an initial "high-level" description of the circuitry must be converted into a description of an actual physical implementation of the circuitry in silicon. The description of the physical implementation generally includes all of the electronic components (i.e. transistors, diodes, resistors, capacitors, inductors, adders, multipliers, flip-flops, gates, buffers, etc.) and the paths (i.e. electrical conductor traces) for all of the signals between all of the components. Some of these signal paths are for the data that produce the overall function of the integrated circuit. Additionally, some of the signal paths are for one or more clock signals that trigger the function of some of the electronic components, such as flip-flops.

Some of the electronic components must be synchronized with others of the electronic components in order to ensure that these electronic components receive the correct data signals at the right time and produce reliable data output therefrom. Thus the rising and/or falling edges of the clock signals must trigger these electronic components at precisely the right time to synchronize their function. Therefore, a significant part of the design process for the integrated circuit involves analyzing the clock signal paths and components in these paths to determine the arrival time of rising and/or falling edges of the clock signals at the various synchronized electronic components.

During the design process, an initial physical placement is made of "high-level" primary data path and clock path components followed by an optimization of the data path components. In other words, the essential data and clock path electronic components and signal paths between them are placed in the design, but significantly more details in the data path are usually determined before the complete physical placement of the clock path components. Then, when buffers and other detail design components in the clock path are instantiated, their effect on the timing of the clock signals and the data path components' signal arrival time can be determined. The addition of such details (e.g. additional clock path component placement, buffering, etc.) in the clock path is commonly referred to as "clock tree synthesis."

Clock tree synthesis (CTS) instantiates the clock circuitry or builds a clock buffer tree according to a clock tree specification file, generates a clock tree topology, and balances clock phase delay with inserted clock buffers. Before CTS, the clock timing is in "ideal clock mode." Ideal clock mode means that it is assumed that there are no delays in the clock signals. In other words, prior to CTS, the initial placement of the primary data and clock path components, along with detailed optimization of the data path, is done without knowing the effect of the clock signals in the design. After the clock tree has been instantiated, however, the clock timing is in "propagated clock mode," in which delays in the clock signals have been determined. It is, thus, only after the CTS stage of the design process when it is possible to determine whether the clock signals properly synchronize the data path components.

Those clock signals that do not properly synchronize the data path components are said to have clock timing violations, including clock gating setup violations. True clock timing violations can be seen during the design process only after the CTS stage, once the clock timing is in propagated clock mode. Post-CTS data path optimizers can sometimes fix the clock gating setup violations. However, it is often too late during the design process to fix the clock gating setup violations after the CTS stage, because there has typically been a lot of data path optimization that happened before the CTS stage that may have greatly restricted the options for further modifications. Additionally, the clock may be so restricted that the data path optimizers may not fulfill the requirements for data path signal arrival times. Although the pre-CTS optimizers operate on the clock gating setup violations, the pre-CTS optimizers may not even "see" the clock delays and clock gating setup violations, since the clock is in ideal clock mode during that part of the design process.

Additionally, the post-CTS optimizers often cannot fix clock gating setup violations, because such optimizers operate on the data path, rather than on the clock path. Thus, although operations on the data path can affect clock gating setup violations, the post-CTS optimizers are limited by the clock path arrival times. In fact, once the CTS stage is done, the clock tree, or the clock path, is considered to be completed. Modifications to the clock path after the CTS stage generally lead to worse timing violations, because symmetry, or skew, in the clock path usually worsens. Therefore, if a clock path solution has been committed during the CTS stage that is not good for clock gating setup violations, then the post-CTS data path design optimizers will likely not be able to fix these violations. In such a situation, it can be very difficult, if not impossible, for the design process to "converge" on a final design. This problem is often a major bottleneck at this point in the design process.

BRIEF SUMMARY OF THE INVENTION

Overall design convergence is enhanced by a process that emulates CTS at a point in the design process after the initial placement is made of "high-level" primary clock path components and before the actual CTS stage instantiates the clock network. As a result, clock delays can be virtually determined and propagated through the initial clock network to further virtually determine the clock gating setup violations. With this information, clock gates with setup violations can be subjected to restructuring, or transformations, by which the clock gating setup violations are fixed, or minimized. The best transformations (based on clock delay and/or power consumption) are saved, so that the subsequent actual CTS stage operates on a clock network that has been optimized to ensure that the actual CTS stage produces a usable clock network.

DETAILED DESCRIPTION OF THE INVENTION

Figure 1:
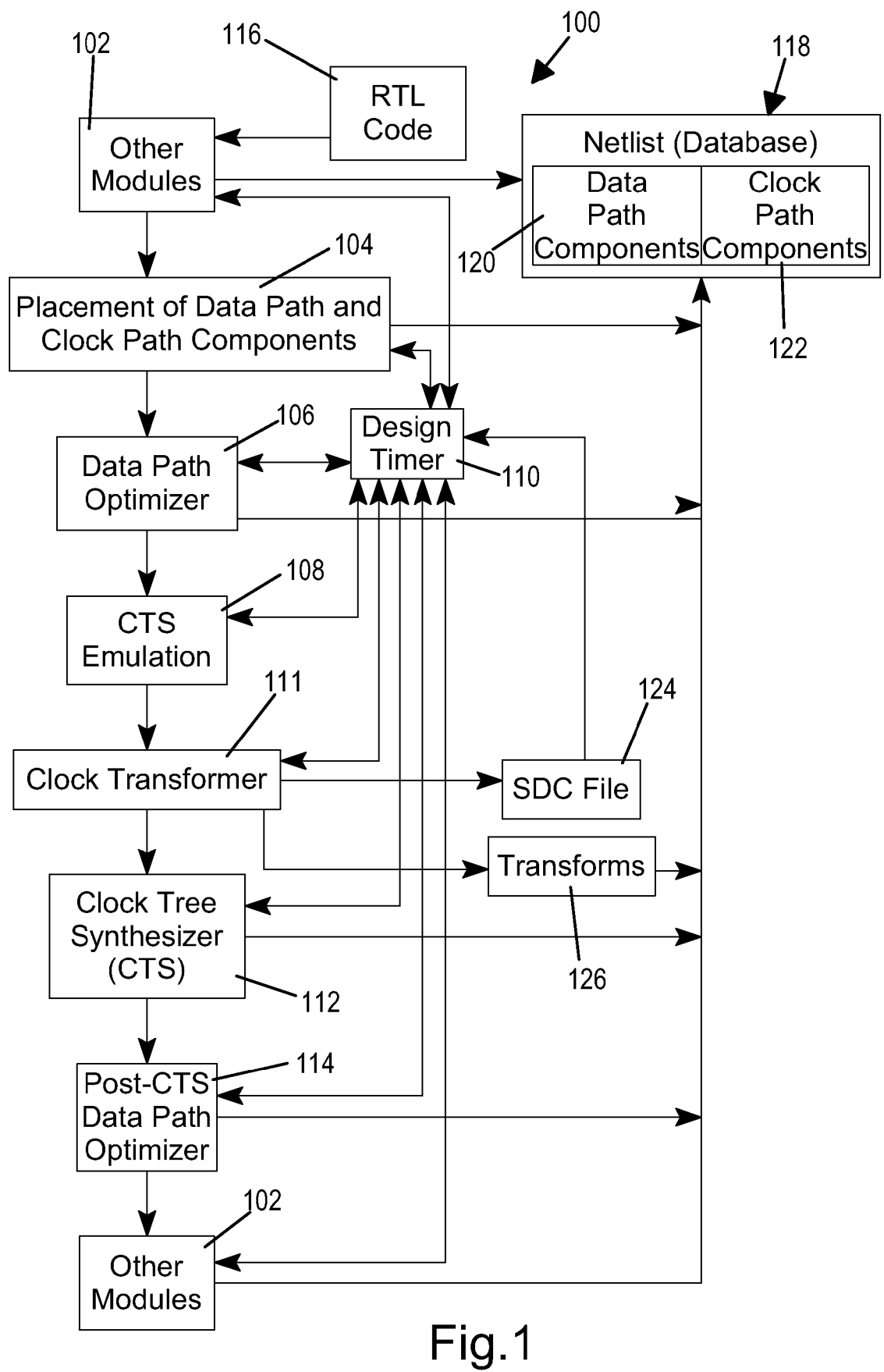
FIG. 1 is a simplified schematic diagram of modules used in the flow of a design process, incorporating an embodiment of the present invention, for designing an integrated circuit.

Tools for designing an integrated circuit typically include several modules (representing design "stages") that perform various functions of the design process. Schematic diagram 100, FIG. 1, shows an exemplary set of such modules 102-114 (used in a simplified flow of a design process similar to that available in the "Cadence Encounter Digital IC Design Platform") that includes additional modules, features or functions (described below) that enable more rapid and efficient fixing of clock timing violations, such as clock gating setup violations, and more rapid and efficient overall design convergence than is available in the prior art. These advantages are primarily achieved by a design process that emulates clock tree synthesis (CTS) at an earlier point in the design flow than the point at which actual CTS is performed to instantiate the clock circuitry. In other words, the clock tree, or clock network, is virtually synthesized, so it becomes possible to calculate clock delays that propagate through the gates of the clock network. With the calculated clock delay data, clock gating setup violations are determined. With the data regarding these violations, clock gates are selected and evaluated for restructuring, or transforming, in order to minimize or eliminate the clock gating setup violations that are due to unacceptable clock delay situations. (According to some embodiments, the restructured, or transformed, clock gates are also evaluated for low power consumption, so that the best gate transforms are determined and selected based both on clock delay gains and power consumption gains.) In this manner, the clock network is optimized prior to actual clock tree synthesis, i.e. the stage at which the clock gates are fully committed to the circuit design, so that design convergence is more readily achieved in the stages that follow the clock network optimization.

In this example, an integrated circuit is created by initially defining the circuitry in an RTL (Register Transfer Level) code 116, such as VHDL or System Verilog. The RTL code 116 is incrementally synthesized to a netlist 118 by the modules 102-114, each of which generates or modifies various parts of the netlist 118. The netlist 118 is a database that defines the components and structures (including all data path components 120 and all clock path components 122) that form the integrated circuit that is eventually to be manufactured. In its final form, thus, the netlist 118 is used to fabricate the integrated circuit.

Among various other appropriate modules 102, or "tools," this example includes a module for the initial placement of "high-level" data path and clock path components (placement module 104), a data path optimizer 106, a module for virtually emulating clock tree synthesis (CTS emulation module 108), a design timer 110, a clock transformer, or restructuring, module 111, a clock tree synthesizer (CTS stage) 112 and a post-CTS data path optimizer 114. (Other sets of modules within the scope of the present invention may use different types and/or combinations of design modules to generate a database of components and structures from which the integrated circuit can be manufactured.) The flow of the design process generally, but not necessarily, follows the arrows as shown in FIG. 1 through each of the modules 102-114 to incrementally generate and modify the various portions of the netlist 118.

According to various embodiments, the other modules 102 that are used prior to the placement module 104 generally perform relatively high-level functions, such as importing the design, laying out a floor plan, pre-placing some standard cells and blocks, setting I/O pins, adding power rings and stripes and connecting blocks and cells to the power structures for the integrated circuit, among other functions to generate the initial netlist 118. The placement module 104 generally places standard cells and blocks of the data path components 120 and the clock path components 122 in the netlist 118 to create an overall placement that is routable and meets any preferred performance constraints. Such placement of components 120 and 122 may be considered "tentative," since subsequent stages may modify these components 120 and 122. For example, the data path optimizer 106 (sometimes referred to as a pre-CTS optimizer) generally modifies the data path components 120 in the netlist 118 to optimize their placement and/or size or inserts new buffers or remaps logic in consideration of timing constraints, power consumption and minimization of physical area. Additionally, particularly for low power designs, the clock path components 122 normally include clock gates to "gate the clock" in order to improve or reduce power consumption.

The design timer 110 is generally a supporting tool, which is used by some of the modules 102-108 and 111-114 as needed to generate a timer graph that shows timing at various points in the integrated circuit. The design timer 110 generally calculates timing values at all the paths and/or pins in the netlist 118 and puts the timing information into the timer graph. It is, thus, the timer graph that is used by the modules 102-108 and 111-114 for timing analysis.

The CTS emulation module 108, in accordance with various embodiments, generally emulates the function, or estimates the results, of the CTS stage 112. Unlike the CTS stage 112, however, the CTS emulation module 108 does so "virtually," i.e. in memory, without committing any changes to the netlist 118.

The CTS emulation module 108 creates virtual clock buffering with appropriately placed virtual gates, buffers and routes to ensure that timing constraints are met. These components are "virtual" since they are not committed to the netlist 118 at this point. Additionally, these components are of the type that is conventionally generated later in the design process by the CTS stage 112. In this manner, the CTS emulation module 108 emulates clock tree synthesis at a point in the design process before actual clock tree synthesis.

In some embodiments, the CTS emulation module 108 uses a very similar "engine" as the CTS stage 112, except that it will not commit any changes to the netlist 118. Instead, the CTS emulation module 108 generates clock path information virtually, e.g. in computer memory.

Prior to running the CTS emulation module 108, the clock timing has been in ideal clock mode, so it has been assumed that there have been no delays in the clock signals. After the clock network is virtually synthesized by the CTS emulation module 108, however, the insertion delays of the clock network are calculated by the clock transformer module 111, using the design timer 110, by propagation of the delay through the clock gates, virtual clock buffers and the virtual clock routes that were generated by the CTS emulation module 108. At this point, the clock delays and the transitions at all the clock pins in the design of the integrated circuit are known. (Thus, at this point in the design process, it is possible to "see" the clock gating setup violations, although it is still in the pre-CTS stage.)

According to an embodiment, the clock delay data is written to a file 124 that specifies timing constraints on corresponding clock pins. A file formatted according to the Synopsys Design Constraints (SDC) format is an example of such a file. However, the present invention is not limited to using only an SDC formatted file. (An SDC formatted file is commonly used both for timing-driven place and route and for timing analysis and contains timing and design constraints in an expanded and elaborate form.)

The file 124, in this embodiment, is loaded back into the design timer 110 by the clock transformer module 111. In this manner, the design timer 110 can now "see" the clock gating setup violations, because the clock delays have been virtually introduced to the design timer 110. Since the design timer 110 can see the clock gating setup violations, the clock transformer module 111 can improve the clock gating setup violations by restructuring the netlist 118 before actual clock tree synthesis.

In some embodiments, the clock transformer module 111, affects the clock gating setup violations by performing various transforms on the virtual clock gates. It uses the design timer 110, a static timing analysis (STA) tool, to update the timer graph incrementally and virtually in order to "see" the causes of various transforms. Such transforms may include, but are not limited to, cloning, resizing and relocating (and combinations thereof) the clock gates that have unacceptable timing violations. These transforms will result in different clock delays for the virtual clock buffers, so the clock gating setup violations can be reduced or eliminated.

In a particular embodiment, the clock transformer module 111 preferably performs different variations and combinations of the transforms on each of the violating clock gates and evaluates the results in order to perform a what-if analysis to select the best transform with the best timing gain, or improvement. During this evaluation process, the clock transformer module 111 re-calculates new clock and data path delays and incrementally synthesizes the affected portions of the clock network.

The analysis, in this embodiment, preferably involves a comparison not only of the new resulting clock delay, but also of the electrical power consumption for each of the transforms, since each transform will also result in a different power consumption for the transformed gate. In this manner, the selection for the "best" transform for each violating clock gate may be based on the best clock delay result (best timing gain) or the lowest power consumption result (best power consumption gain) or an acceptable combination thereof. Thus, not only are the clock gating setup violations corrected during this stage of the design process, but the power consumption level may also be reduced or minimized.

According to various embodiments, the selected transforms 126 for the violating clock gates are committed to the clock path components 122 of the netlist 118. Additionally, in some embodiments, the timing constraints are reset to initial conditions to put the design back into ideal clock mode before entering the CTS stage 112.

In general, the CTS stage 112 analyzes all clocks in a design (or specifically defined clocks) and inserts buffers (or inverters) to reduce or eliminate clock skew. The CTS stage 112, thus, builds the clock buffer tree according to a clock tree specification file, generates a clock tree topology, and balances clock phase delay with inserted clock buffers. However, since the CTS emulation module 108 and the clock transformer module 111 have already optimized the clock network (i.e. the clock path components 122), the CTS stage 112 is able to complete the clock network much more quickly and efficiently than it otherwise could have done. As a result, the CTS stage 112 can more reliably produce a stable clock, which leads to proper timing and operation of the resulting integrated circuit. Additionally, since the CTS stage 112 has been able to produce an acceptable clock network, the post-CTS data path optimizer 114 (and the other modules 102 that are used after the post-CTS data path optimizer 114) does not have to contend much with clock gating setup violations.

Figure 2:
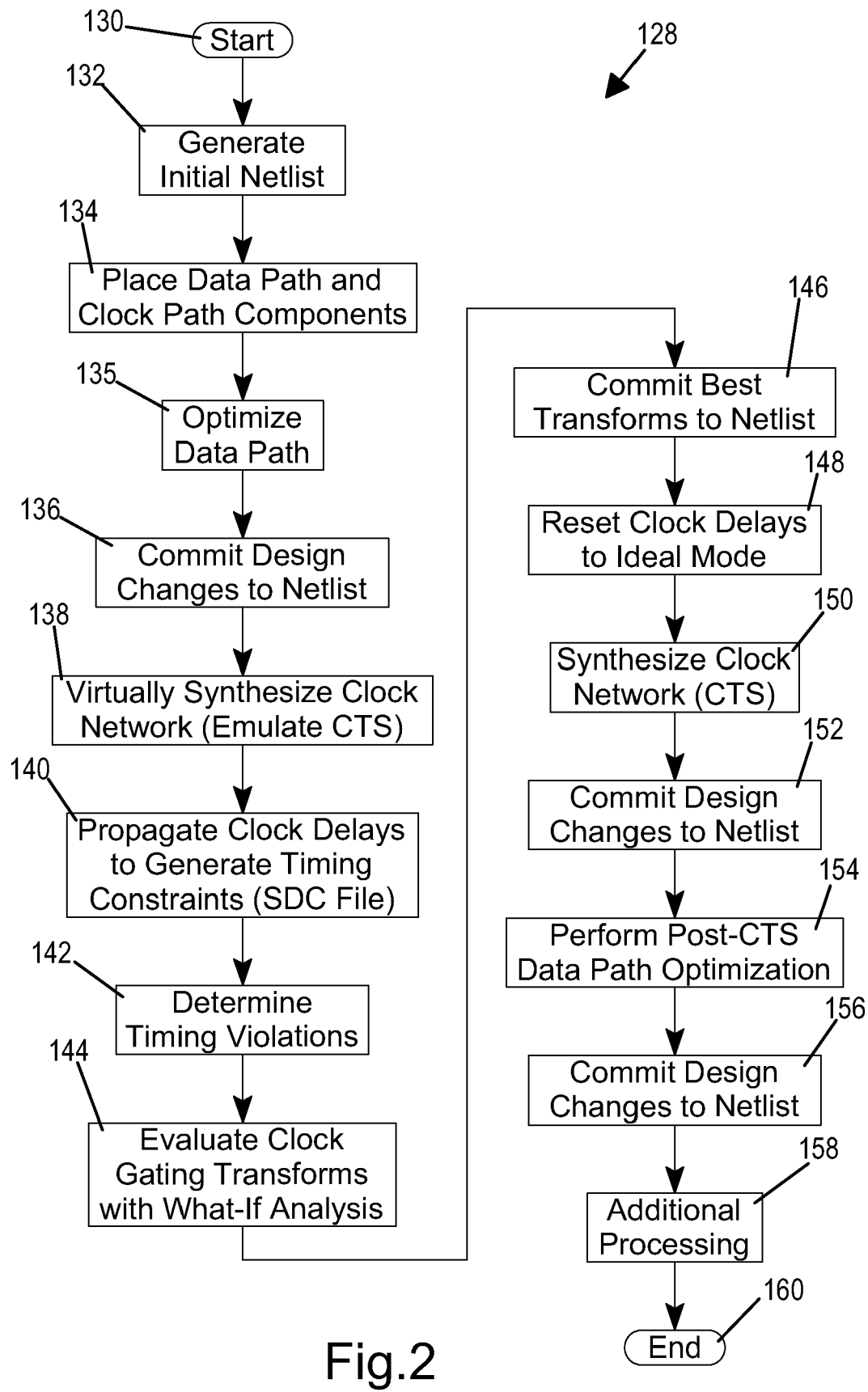
FIG. 2 is a simplified flowchart of a portion of a process, incorporating an embodiment of the present intention, for designing an integrated circuit.

An exemplary process 128 (a portion of a design process for designing an integrated circuit) according to a simplified embodiment of the present invention is shown in FIG. 2. Upon starting (at 130), the appropriate other modules 102 generate (at 132) the initial netlist 118. At 134, the placement module 104 makes the initial placement of the primary data path components 120 and clock path components 122. At 135, the data path components 120 are optimized by the data path optimizer 106. At 136, the design changes caused by the initial placement of the data path components 120 and clock path components 122 and the data path optimization are committed to the netlist 118. (Alternatively, various design changes can be committed to the netlist 118 at different appropriate times in the design flow.) At 138, the CTS emulation module 108 virtually synthesizes the clock network. At 140, the clock transformer module 111 uses the design timer 110 to propagate the clock delays through the virtual clock network to generate timing constraints in the file 124. At 142, the file 124 is loaded back into the design timer 110 by the clock transformer module 111 in order to determine the clock gating setup violations.

At 144, available clock gating transforms are evaluated, preferably with a what-if analysis, to determine the best transforms based on timing violations and power consumption, as described below with reference to FIG. 3. At 146, the best transforms are committed to the netlist 118. At 148, the clock delays are reset to ideal mode. At 150, the CTS stage 112 synthesizes the clock network. At 152, the design changes due to the clock network synthesis are committed to the netlist 118. At 154, the post-CTS data path optimization is performed. At 156, the design changes due to the post-CTS data path optimization are committed to the netlist 118. At 158, additional other modules 102 perform any additional processing needed to complete the design process before the exemplary process 128 ends at 160. With this exemplary process 128, clock timing closure (and overall design closure) is reliably achieved.

Figure 3:
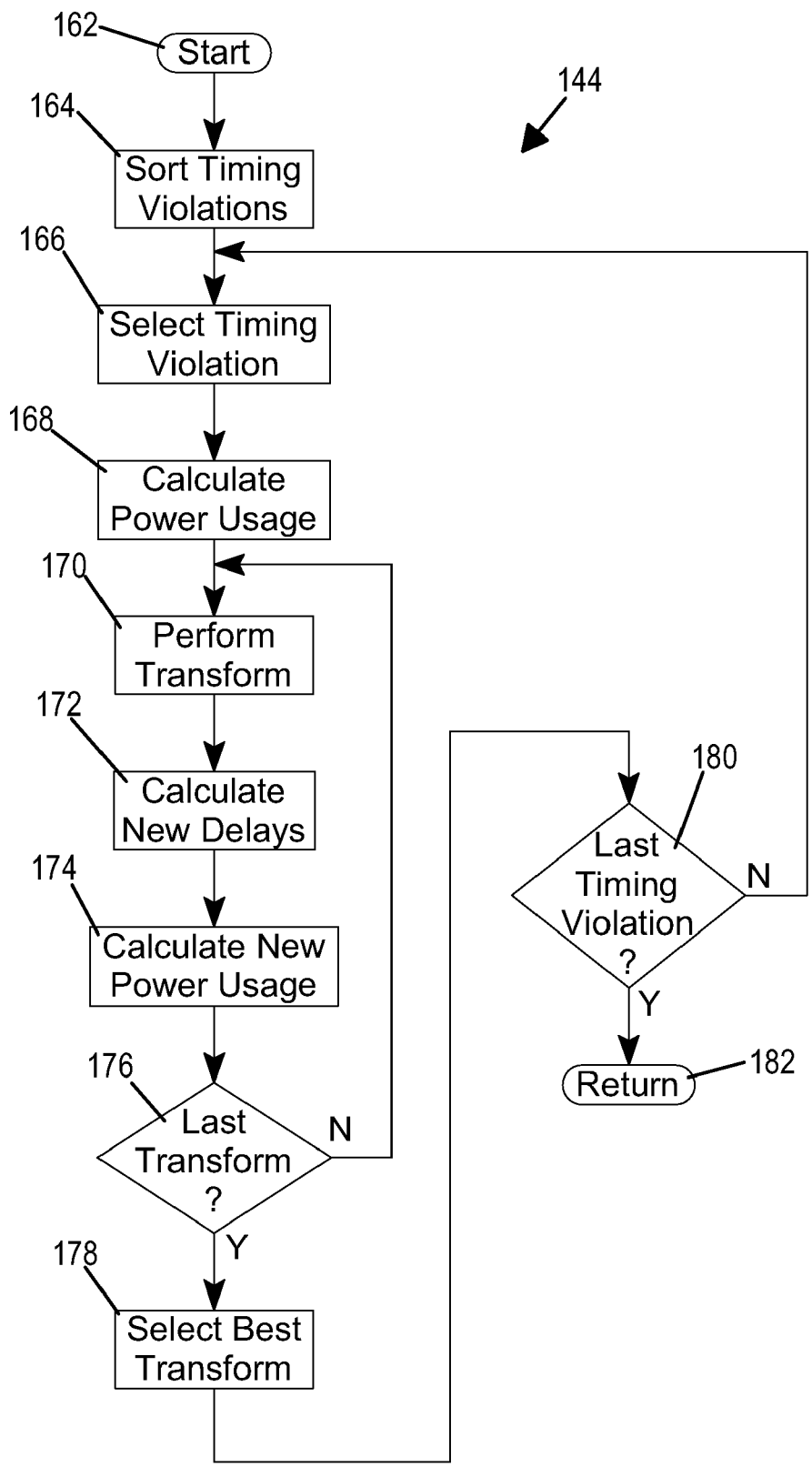
FIG. 3 is a more detailed flowchart of part of the process shown in FIG. 2, incorporating an embodiment of the present intention.

An exemplary process for the evaluation at 144 is shown in FIG. 3. Upon starting (at 162), the timing violations determined at 142 are sorted (at 164), according to some embodiments, so that they can be evaluated in order starting with the worst violation. At 166, the first, or worst, clock gating setup violation is selected for evaluation. At 168, the power usage of the existing clock gate and its immediately following virtual clock sub-tree, or buffer, is calculated, so that it can be compared with the transforms that will be made below. At 170, the first transform is performed for this clock gating setup violation, e.g. cloning, resizing, relocating, etc. of the clock gate. At 172, the new clock and data path delays due to the first transform are calculated. At 174, the new power usage for the first transform and its immediately following virtual clock sub-tree is calculated.

At 176, it is determined whether the current transform being evaluated is the last to be tried for this clock gating setup violation. If not, the exemplary evaluation process 144 returns to 170 to perform the next available transform for this clock gating setup violation and to calculate the new delays (at 172) and new power usage (at 174) for this transform. The exemplary evaluation process 144, thus, performs each available transform (and calculates the evaluation parameters, delays and power usage) for this clock gating setup violation at 170-176.

After performing the last transform for this clock gating setup violation, as determined at 176, the best transform for this clock gating setup violation is selected at 178, based on the best delays (timing gains) or power usage (power consumption gains) or combination thereof. At 180, it is determined whether the current clock gating setup violation being subjected to transform evaluations is the last clock gating setup violation that needs to be corrected. If not, the exemplary evaluation process 144 returns to 166 to select the next clock gating setup violation. The exemplary evaluation process 144, thus, repeats 166-180 for each clock gating setup violation before returning (at 182) to the exemplary process 128 in FIG. 2 to continue at 146.

Figure 4:
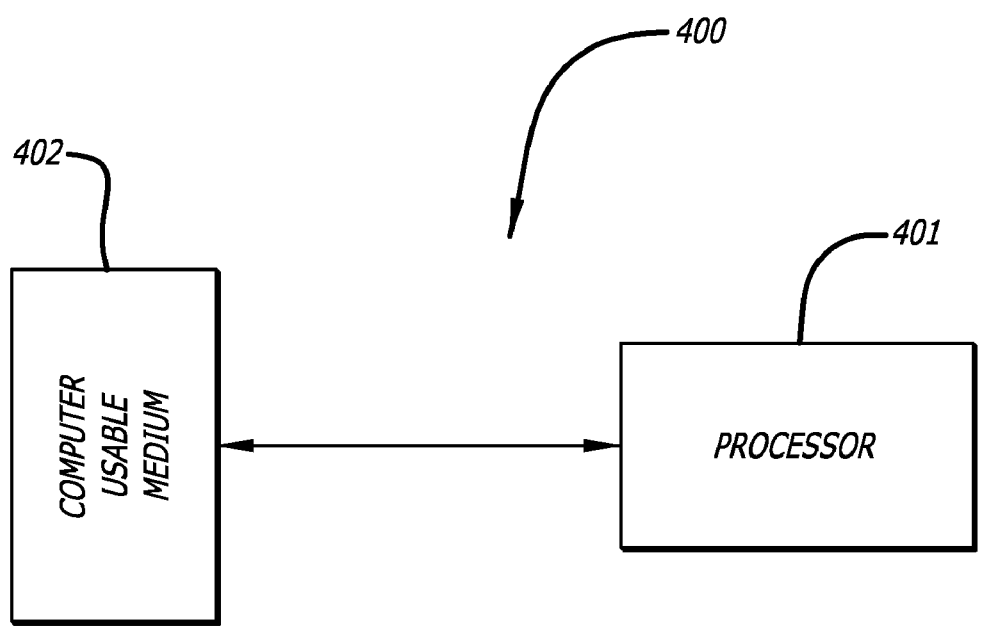
FIG. 4 illustrates a block diagram of an electronic device.

"Referring now to FIG. 4, an electronic device 400 includes a processor 401 and a computer-usable medium 402 in communication together as shown. The computer-usable medium 402 is a storage device to store computer readable instructions thereon. In one embodiment of the invention, the computer-usable medium 402 is a memory. The computer readable instructions are for execution by the processor 401 in order to perform the processes shown and described herein to achieve clock timing closure in the design of an integrated circuit."

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to limit the invention. Thus, it is intended that the present subject matter covers such modifications and variations as come within the scope of the appended claims and their equivalents.

What is claimed is:

1. A method for achieving clock timing closure in designing an integrated circuit, comprising:
   with a processor
      virtually synthesizing a clock network for the integrated circuit design to generate virtual clock buffering in the clock network;
      determining timing violations of clock gates generated by the virtual clock buffering;
      evaluating clock gating transforms for the clock gates having the timing violations, based on recalculated clock and data path delays, to incrementally virtually synthesize the clock network;
      committing to a netlist the clock gating transforms that result in the best timing gains;
      synthesizing the clock network for the integrated circuit design; and
      committing design changes, due to the clock network synthesis, to the netlist.

2. The method of claim 1, wherein:
   the evaluating of the clock gating transforms is based on power consumption and the recalculated clock and data path delays; and
   the committing to the netlist of the clock gating transforms further comprises committing to the netlist the clock gating transforms that result in the best combined power consumption and timing gains.

3. The method of claim 1, further comprising:
   before virtually synthesizing the clock network, placing data path components for the integrated circuit design, using an ideal mode for clock delays in the integrated circuit design; and
   committing design changes, due to the data path component placement, to the netlist.

4. The method of claim 1, further comprising:
   propagating the clock delays for the integrated circuit design, using the generated virtual clock buffering, to generate timing constraints for the integrated circuit design, without committing the clock delays to the net list.

5. The method of claim 4, wherein:
   the propagating of the clock delays occurs in a clock transformer module using a design timer module; and
   the determining of the timing violations further comprises loading the timing constraints back into the design timer module.

6. The method of claim 5, wherein:
   the clock transformer module generates a file having the timing constraints; and
   the loading of the timing constraints further comprises loading the file back into the design timer module.

7. The method of claim 1, further comprising:
   before the synthesizing of the clock network, resetting the clock delays to an ideal mode.

8. The method of claim 1, wherein:
   the evaluating of the clock gating transforms further comprises a what-if analysis to determine for each clock gate the best transform, among available transforms, that would reduce the timing violations.

9. A non-transitory computer-usable medium having one or more computer readable instructions stored thereon for achieving clock timing closure in designing an integrated circuit, the one or more computer readable instructions when executed by a processor perform operations comprising:
   virtually synthesizing a clock network for the integrated circuit design to generate virtual clock buffering in the clock network;
   determining timing violations of clock gates generated by the virtual clock buffering;
   evaluating clock gating transforms for the clock gates having the timing violations, based on recalculated clock and data path delays, to incrementally virtually synthesize the clock network;
   committing to a netlist the clock gating transforms that result in the best timing gains;
   synthesizing the clock network for the integrated circuit design; and
   committing design changes, due to the clock network synthesis, to the netlist.

10. The non-transitory computer-usable medium of claim 9, wherein:
    the evaluating of the clock gating transforms is based on power consumption and the recalculated clock and data path delays; and
    the committing to the netlist of the clock gating transforms further comprises committing to the netlist the clock gating transforms that result in the best combined power consumption and timing gains.

11. The non-transitory computer-usable medium of claim 9, wherein the method further comprises:
    before virtually synthesizing the clock network, placing data path components for the integrated circuit design, using an ideal mode for clock delays in the integrated circuit design; and
    committing design changes, due to the data path component placement, to the netlist.

12. The non-transitory computer-usable medium of claim 9, wherein the method further comprises:
    propagating the clock delays for the integrated circuit design, using the generated virtual clock buffering, to generate timing constraints for the integrated circuit design, without committing the clock delays to the netlist.

13. The non-transitory computer-usable medium of claim 12, wherein:
the propagating of the clock delays occurs in a clock transformer module using a design timer module; and
the method further comprises, before the determining of the timing violations, loading the timing constraints back into the design timer module.

14. The non-transitory computer-usable medium of claim 13, wherein:
the clock transformer module generates a file having the timing constraints; and
the loading of the timing constraints further comprises loading the file back into the design timer module.

15. The non-transitory computer-usable medium of claim 9, wherein the method further comprises:
before the synthesizing of the clock network, resetting the clock delays to an ideal mode.

16. The non-transitory computer-usable medium of claim 9, wherein:
the evaluating of the clock gating transforms further comprises a what-if analysis to determine for each clock gate the best transform, among available transforms, that would reduce the timing violations.

17. An electronic device for achieving clock timing closure in designing an integrated circuit, comprising:
a processor; and
a computer-useable medium in communication with the processor to execute instructions stored in the computer-useable medium, the instructions stored in the computer-useable medium include
instructions for placing data path components for the integrated circuit design, using an ideal mode for clock delays in the integrated circuit design;
instructions for committing design changes, due to the data path component placement, to a netlist;
instructions for virtually synthesizing a clock network for the integrated circuit design to generate virtual clock buffering in the clock network;
instructions for determining timing violations of clock gates generated by the virtual clock buffering;
instructions for evaluating clock gating transforms for the clock gates having the timing violations, based on recalculated clock and data path delays, to incrementally virtually synthesize the clock network;
instructions for committing to the netlist the clock gating transforms that result in the best timing gains;
instructions for synthesizing the clock network for the integrated circuit design; and
instructions for committing design changes, due to the clock network synthesis, to the netlist.

18. The electronic device of claim 17, wherein:
the instructions for evaluating the clock gating transforms bases the evaluation on power consumption and the recalculated clock and data path delays; and
the instructions for committing to the netlist the clock gating transforms are further for committing to the netlist the clock gating transforms that result in the best combined power consumption and timing gains.

19. The electronic device of claim 17, wherein:
the instructions stored in the computer-useable media further include
instructions for propagating the clock delays for the integrated circuit design, using the generated virtual clock buffering, to generate timing constraints for the integrated circuit design, without committing the clock delays to the netlist.

20. The electronic device of claim 19, wherein:
the instructions for propagating the clock delays and the means for determining of the timing violations include a clock transformer module using a design timer module; and
the instructions stored in the computer-useable media further include
instructions for loading the timing constraints back into the design timer module.

21. The electronic device of claim 20, wherein:
the clock transformer module generates a file having the timing constraints; and
the instructions for loading the timing constraints further includes instructions for loading the file back into the design timer module.

22. The electronic device of claim 17, wherein:
the instructions stored in the computer-useable media further include
instructions for resetting the clock delays to the ideal mode before the synthesizing of the clock network.

23. The electronic device of claim 17, wherein:
the instructions for evaluating of the clock gating transforms further include
instructions for performing a what-if analysis to determine for each clock gate the best transform, among available transforms, that would reduce the timing violations.

* * * * *